United States Patent
Sartor et al.

(10) Patent No.: US 10,189,125 B2
(45) Date of Patent: Jan. 29, 2019

(54) ASSEMBLY INSPECTION METHOD AND ASSOCIATED DEVICE

(71) Applicant: Airbus Operations (SAS), Toulouse (FR)

(72) Inventors: Marc Sartor, Toulouse (FR); Patricia Morgue, Colomiers (FR); Manuel Paredes, Balma (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 138 days.

(21) Appl. No.: 15/221,823

(22) Filed: Jul. 28, 2016

(65) Prior Publication Data

US 2016/0339548 A1    Nov. 24, 2016

Related U.S. Application Data

(62) Division of application No. 14/136,298, filed on Dec. 20, 2013, now Pat. No. 9,427,836.

(30) Foreign Application Priority Data

Dec. 20, 2012 (FR) .................................... 12 62503

(51) Int. Cl.
*G01L 5/24*        (2006.01)
*B23P 19/04*       (2006.01)
(Continued)

(52) U.S. Cl.
CPC .............. *B23P 19/04* (2013.01); *B23Q 17/22* (2013.01); *G01L 5/0076* (2013.01); *G01L 5/24* (2013.01);
(Continued)

(58) Field of Classification Search
CPC .......... B23P 19/04; G01L 5/0076; G01L 5/24; B23Q 17/22; Y10T 29/49764; Y10T 29/53087
See application file for complete search history.

(56) References Cited

U.S. PATENT DOCUMENTS 4,344,216 A    8/1982 Finkelston
4,530,143 A    7/1985 Casarcia
(Continued)

FOREIGN PATENT DOCUMENTS

FR    2813390    3/2002
GB    2096361    10/1982

OTHER PUBLICATIONS

French Search Report, dated Sep. 26, 2013.

*Primary Examiner* — Jun Yoo
(74) *Attorney, Agent, or Firm* — Greer, Burns & Crain, Ltd.

(57) ABSTRACT

A method for inspecting the quality of an alignment between the elements of an assembly, and an associated device, the method of which comprises tasks consisting of measuring a first parameter with a first measuring means, said first parameter being selected from a movement parameter of at least one part of the double-access fastening means, an assembly force parameter or a torque, measuring a second parameter with a second measuring means, said second parameter being selected from the same parameters and being different from the first parameter, calculating a value of a first derivative of a function representing a change in the second parameter relative to the first parameter by suitable information processing means, and analyzing the value of the first derivative to check the alignment between the elements to be assembled.

7 Claims, 3 Drawing Sheets

(51) Int. Cl.
  *B23Q 17/22* (2006.01)
  *G01L 5/00* (2006.01)
(52) U.S. Cl.
  CPC .... *Y10T 29/49764* (2015.01); *Y10T 29/53087* (2015.01)

(56) References Cited

U.S. PATENT DOCUMENTS

| | | |
|---|---|---|
| 4,685,050 A | 8/1987 | Polzer et al. |
| 2001/0037550 A1 | 11/2001 | Shoberg |
| 2002/0023503 A1 | 2/2002 | Schneider et al. |
| 2006/0137463 A1 | 6/2006 | Nassar et al. |

ASSEMBLY INSPECTION METHOD AND ASSOCIATED DEVICE

CROSS-REFERENCE TO RELATED APPLICATIONS

This Application claims the benefit of the French patent application No. 1262503 filed on Dec. 20, 2012, the entire disclosures of which are incorporated herein by way of reference. This Application is also a divisional of co-pending application Ser. No. 14/136,298, which was filed on Dec. 20, 2013, the entire disclosures of which are incorporated herein by way of reference.

FEDERALLY SPONSORED RESEARCH OR DEVELOPMENT

N/A

TECHNICAL FIELD

The present invention relates to an inspection method used to detect an alignment defect between two elements to be assembled; more particularly, it relates to an apparatus which analyzes a normal process for installing fasteners to assemble two elements (structural fasteners, pins, etc.).

BACKGROUND OF THE INVENTION

Due to increased production rates, production plants are increasingly obliged to use equipment that makes it possible to save time and reduce cycles on already highly optimized assembly procedures. One of the keys to the quality of the assemblies, particularly in terms of fatigue life, is ensuring that the assembled elements are in contact with each other, and that there is no lubricant, contamination, deformation or defect relating to piercing at the interface between the elements. Quality inspection in this area is tending to become more complex due to the spread of new practices, particularly the elimination of certain tasks, or stages, known as reference tasks, from assembly procedures.

The conventional procedures used to ensure good assembly quality are defined by the following tasks: positioning of the elements, piercing phase, separation of the elements (disassembly), deburring, cleaning, application of sealant, positioning of the elements (reassembly) and installation of the fasteners.

So-called "no-disassembly" procedures are increasingly used to ensure increased production rates. As an example, one of said procedures is defined by the following tasks: application of sealant, positioning of the elements, piercing phase and installation of the fasteners.

Although they enable a considerable time saving, "no-disassembly" procedures can generate more defects. As an example, in a conventional procedure, the presence of burrs can be inspected during the disassembly operation and rectified before reassembly, which is not possible in a no-disassembly procedure.

According to another example, contamination with cutting fluid is sometimes generated during piercing. In a conventional procedure, piercing takes place before disassembly, the interfaces are cleaned before reassembly and before application of the sealant, and the quality of the interface is therefore independent of the level of contamination generated. With a no-disassembly procedure, piercing can take place after sealant application during the sealant tack time (referring to fresh sealant); the sealant is then in a state of viscosity that can allow cutting fluid seepage at the interface.

According to a further example, it is vital that contact between the elements be ensured to avoid loss of fastener preload over time, which has an impact on the fatigue resistance of the assembly. In a conventional procedure, the bores are pinned at 100% until the intermediate sealant has cured, whereas in a no-disassembly procedure, retightening is required when the permanent fasteners are installed in fresh sealant in order to ensure satisfactory flow of the sealant for the required "metal-metal", or at least element against element, contact.

"No-disassembly" procedures are thus generally "blind" in the sense that it is not possible to perform non-destructive inspection of the quality of the interface (in other words, the thickness of the sealant at the fasteners, the presence of swarf, burrs, cutting fluid, play, deformation or general contamination). Said new no-disassembly procedures are therefore approved on a case-by-case basis by means of ad hoc disassembly tests. Said tests cannot be generic and must be performed zone by zone, and even workshop by workshop, such is the importance of the geometry and rigidity of the elements (depending on whether small elements are being assembled or large sub-assemblies such as on the FAL (Final Assembly Line) for example) and the equipment used (piercing, pinning, jigs) with regard to the end quality. The defects or contamination present at the interfaces are then inspected visually.

Said tests require a procedure that is designed and set in advance; they are time- and energy-consuming and involve risks, for example during the handling of panels as elements (impacts, damage relating to the curing of the sealant, damage to bores/fasteners, realignment of bores, etc.). Furthermore, they cannot ensure that the quality of the assembly will endure over time, as they only give a snapshot at a given time t. The deviation of the installation conditions introduces a risk of non-conformity that becomes real if the requirements relating to the interfaces are not inspected more directly and systematically.

SUMMARY OF THE INVENTION

In order to at least partially solve the aforementioned problems, a method for inspecting the quality of an alignment of at least a first element and a second element of an assembly by a double-access fastening means, comprising the following tasks:

A task of measuring a first parameter with a first measuring means, said first parameter being selected from a movement parameter of at least a first part of the double-access fastening means, an assembly force parameter or a torque;

A task of measuring a second parameter with a second measuring means, said second parameter being selected from the movement parameter of at least the first part of the double-access fastening means, the assembly force parameter and the torque, and the second parameter being different from the first parameter;

A task of calculating a value of a first derivative of a function representing a change in the second parameter relative to the first parameter by suitable information processing means;

A task of analyzing the value of the first derivative calculated by the suitable information processing means to check the alignment between at least the first element and the second element to be assembled.

According to a particularly advantageous embodiment, the analysis task comprises a detection of a change in behavior of the assembly shown by slope variations of the function linking the two parameters in question, the function representing the change in the second parameter relative to the first parameter comprising an alignment phase in which the slope of the curve is then close to zero, a tightening phase, and an optional intermediate phase relating to the presence of a possible residual gap between the first element and the second element of the assembly.

Such a method thus makes it possible to check the alignment between two or more elements of an assembly. In a real situation, alignment between two or more elements is thus understood to mean the alignment of the double-access fastening means on the elements to be assembled initially, followed by the bringing into contact of the elements (the intermediate phase), i.e., the elimination of the possible residual gaps, in a second phase. Hereinafter, the alignment phase itself covers bringing the double-access fastening means into contact with the elements to be assembled. When alignment in general, i.e., the alignment of the elements, is considered, this encompasses both the aforementioned alignment phase and the intermediate phase.

Thus, if the intermediate phase is not detected, when for example the slope of the tightening phase is correct, the alignment is correct; however, if said intermediate phase is detected, it represents play existing between the elements to be assembled, the assembly then being correct if the tightening slope is as expected. If not, a problem relating to alignment is detected.

Here, double-access fastening means is understood to mean a fastening means, both parts of which are accessed to obtain fastening The movement parameter of at least the first part of the double-access fastening means is for example measured directly on the fastening means, or for example by measuring the movement of a tool for installing the double-access fastening means, i.e., for example a working tip of the tool, which it is possible to link directly to the movement of a first part of the double-access fastening means. For example, if the fastener is a screw and nut assembly, the tool is a screwdriver comprising a socket, a tip of which engages with a part of the nut; the movement of a part of the nut is directly linked to the progress of the socket or the number of rotations thereof. Or, for example, by measuring an assembly time for speed-controlled assembly, the movement of at least the first part of the double-access fastening means can be measured indirectly.

It is thus possible to determine, for example, a relative gap between the two parts of the double-access fastening means, for example of the screw/nut or rod/bushing type, such as for example the movement of one part of the screw relative to a corresponding nut if the fastener is a screw, or a rotation angle of the first part of the double-access fastening means relative to a second part of the double-access fastening means, for example the rotation angle of a screw relative to its nut. According to an embodiment, the first parameter corresponds to the relative gap between the first part and a second part of the double-access fastening means, determined by measuring the movement of the first part of the double-access fastening means on the one hand and measuring the movement of the second part of the double-access fastening means on the other hand A similar situation applies to the other aforementioned parameters.

The assembly force comprises the force relating to the assembly operation during the method, or a preload within the assembly once the method is complete.

The assembly force, or the torque in the case of screwing, for example, is preferably determined within the tool for installing the double-access fastening means.

It is thus possible to create a large number of pairs. Particularly beneficial pairs are for example the torque-preload pair, or the torque-angle pair. Of course, it is possible to analyze the first of said parameters as a function of the second, or vice versa.

Such a method makes it possible to use and monitor information generated during the installation of the fasteners, i.e., during an assembly. Each of the tasks can thus be performed in real time or otherwise, as the user wishes or depending on the application.

The first derivative represents a slope of the function at any instant, i.e., at any point of a curve of the function.

Changes in rigidity, or in a more general context, in the behavior of the assembly, shown by variations in the slope of the function linking the two parameters in question, can be detected by analyzing tightening parameters or installation parameters of crimped fasteners, for example. Said changes in rigidity are characteristic of an alignment phase, i.e., of the contact between the elements, the presence of play, interface defects or the deformation of the elements. An analysis of said parameters thus makes it possible to set up a non-destructive means of inspecting the interfaces that is transparent for the workshops as it is directly incorporated into the normal process of installing the fasteners (structural fasteners, pins, etc.) and does not therefore have a negative impact on the cycle. Furthermore, said method enables inspection over time and, as a result, a reduction in the probability of the occurrence of non-conformities and the possibility for the assembly procedure to change over time.

According to an embodiment, to check an alignment status, the task of analyzing the first derivative comprises a task of comparing the value of the first derivative to a predetermined value by the suitable information processing means. The predetermined value is for example pre-recorded, determined in advance, for example, by measuring test assemblies for elements the alignment of which has been checked, or by calculations or simulations.

Thus, for example, if the value of the first derivative is equal to the predetermined value, or at least comprised within a tolerance zone relative to the predetermined value, then there is contact between the elements and the alignment is correct; otherwise, the alignment is incorrect, and the assembly is for example in a play compensation phase.

According to another embodiment of the invention, the task of analyzing the first derivative comprises an alternative or an addition to the task of comparing the first derivative, namely a step of detection by the suitable information processing means of a first point of inflection on a curve representing a change in the second parameter relative to the first parameter, the first point of inflection being characteristic of the alignment of the first and second elements to be assembled, and more particularly here, the alignment of part of the double-access fastening means on one of the elements to be assembled. The alignment of the other part of the double-access fastening means takes place when the double-access fastening means is positioned.

For example, the task of analyzing the first derivative comprises a step of detection by the suitable information processing means of a second point of inflection, labeled point (P), on a curve representing a change in the second parameter relative to the first parameter, the second point of inflection being the point from which the tightening phase is established.

The main points of inflection present on the curve are referred to herein as the first and second points of inflection in order to identify them, but the second is not subordinate to the first.

The method thus comprises a step of identifying the alignment phase, which is a first phase in which the double-access fastening means comes into contact with the first and second elements to be assembled, a step of identifying the optional intermediate phase, in which the possible residual gap present between the two elements to be assembled linked to their possible unevenness is compensated until the elements to be assembled are in plane-to-plane contact, and a step of identifying the tightening phase, in which the slope can be linked to the physical parameters of the elements to be assembled. The first point of inflection is thus defined between the alignment phase and the intermediate phase, and the second point of inflection is defined between the intermediate phase and the tightening phase. Said phases are distinguished in particular on a graph by the fact that the slope, i.e., the derivative, increases from one phase to the next.

The identification of these different phases also makes it possible to inspect and characterize the alignment of the elements to be assembled.

Furthermore, the slopes relating to said three phases are for example such that the slope of the tightening phase is steeper than the slope of the intermediate phase, which in turn is steeper than the slope of the alignment phase, or such that the slope of the tightening phase is shallower than the slope of the intermediate phase, which in turn is shallower than the slope of the alignment phase, depending on the parameters selected. In other words, the slope of the intermediate phase is comprised between the slope of the alignment phase and the slope of the tightening phase.

According to an additional beneficial aspect, the method also comprises a task of comparing at least one of the first and second parameters to at least one corresponding predetermined threshold, and the task of calculating the value of the first derivative is performed once the threshold is reached.

In particular, this makes it possible avoid having to perform the task of calculating the first derivative, and the task of comparing it to the predetermined value if applicable, throughout the entire assembly method. The threshold is for example defined as 80%, or even 90% or more, of a target value of the corresponding parameter at which the assembly is deemed correct. This then makes it possible to ensure that an assembly level has been reached, for example that it is sufficiently tight, in parallel with the inspection of assembly defects, i.e., the detection of incorrect alignment through the detection of play, for example. For example, during assembly using a threaded fastening means such as a screw, assembly is deemed correct if the torque is 1, when the threshold value is for example 0.8; as soon as this value is reached, the first derivative is calculated to ensure that the alignment between the elements to be assembled is validated.

According to an advantageous embodiment, the method also comprises a task of transmitting a signal confirming the validity of the alignment, for example if said value of the first derivative is different from the predetermined value by less than a given tolerance in relation to the predetermined value.

Said signal transmission is for example visual or audible. It is thus possible to easily ensure that the alignment is correct, or otherwise.

In particular, it is possible to slave (or control) the assembly according to one of the parameters of the pair.

According to another aspect of the present invention, a device for inspecting the quality of an alignment of at least a first element and a second element of an assembly by a double-access fastening means is also proposed for the implementation of a method as defined above, characterized in that it comprises:

a tool for installing the double-access fastening means for assembling at least the first element and the second element, a first measuring means for measuring a first parameter selected from a movement parameter of at least a first part of the double-access fastening means, an assembly force parameter or a torque, a second measuring means for measuring a second parameter selected from the movement parameter of at least the first part of the double-access fastening means, the assembly force parameter and the torque, the second parameter being different from the first parameter, suitable information processing means used to calculate a value of a first derivative of a function representing a change in the second parameter relative to the first parameter and analyze the value of the first derivative to check the alignment between at least the first element and the second element to be assembled.

It also makes it possible, for example, to identify an alignment phase, an optional intermediate phase and a tightening phase.

Such a device thus makes it possible to detect incorrect alignment, for example by detecting play. When at least two elements are assembled with a tool for installing the double-access fastening means used to install a fastener between a first element and a second element, for example such as a screwdriver, two different parameters are measured, such as for example torque and angle. Said parameters are then processed by the suitable information processing means, for example to compare them to predetermined values. Said comparison enables the detection of incorrect alignment depending on the difference between the value of the first derivative, resulting from the measured values, and a predetermined, prerecorded value, representative of an aligned assembly.

Of course, according to an embodiment, the suitable information processing means is also capable of detecting a point of inflection on a curve representing a simultaneous change in the two measured parameters, the point of inflection being characteristic in particular of the alignment of the elements to be assembled.

According to an embodiment that can be envisaged, the device comprises a third measuring means for measuring a third parameter selected from the movement parameter of at least the first part of the double-access fastening means, the assembly force parameter and the torque, and being different from the first parameter and the second parameter.

With three measuring means, it is then possible to produce several pairs of parameters to corroborate the analyses, and for example perform parallel analyses to check at least the quality of alignment.

According to another example, the device also comprises a signal transmission system that makes it possible to find out if at least the alignment is correct. The signal transmission system presents, according to an embodiment, separate pieces of information depending on whether the alignment only is correct, or the complete assembly is correct, thus implying that the alignment is correct.

According to an embodiment that can be envisaged, the tool for installing the double-access fastening means comprises at least one of the first and second measuring means.

According to another possible embodiment, the tool for installing the double-access fastening means comprises the suitable information processing means.

The suitable information processing means can be incorporated into the fastener installation tool or be incorporated into a separate tool that would use the measurements taken by the corresponding measuring means, incorporated into the fastener installation tool or otherwise.

The separate tool or the modified tool for installing the double-access fastening means comprises for example the signal transmission system, for example a display system in the event that incorrect alignment is detected. Preferably, the signal emission tool comprises a display system comprising a red diode and a green diode.

In this way, when the diode is red, the assembly is incorrect, for example the alignment phase is not complete, and/or the assembly is not tight enough. The display system is for example coupled with an audible signal.

According to yet another embodiment, one of the first element and second element of the assembly comprises a threaded hole and makes up at least a second part of the double-access fastening means capable of engaging with the first part of the double-access fastening means, which in this case is a screw. For example, in this case the other element comprises a bore such that a screw shank passes through the bore and fastens into the threaded hole.

BRIEF DESCRIPTION OF THE DRAWINGS

According to an embodiment, the invention will be better understood and the advantages thereof will become more apparent on reading the following detailed description, given as a non-limitative illustration, with reference to the attached drawings, in which.

DETAILED DESCRIPTION

The following detailed description sets out the method according to an example based on an embodiment having a "torque-angle" pair, on tightening of a threaded element. Of course, said description is equally valid for a preload-torque or force-relative movement pair, or any combination of the parameters mentioned above. An assembly, shown diagrammatically in FIGS. 1 and 3, comprises a first element 1 and a second element 2, connected by a screw 3 and a nut 4, forming the double-access access fastening means. Play 5 is initially present, here between the first element 1 and the screw 3, and between the second element 2 and the nut 4.

Figure 1:
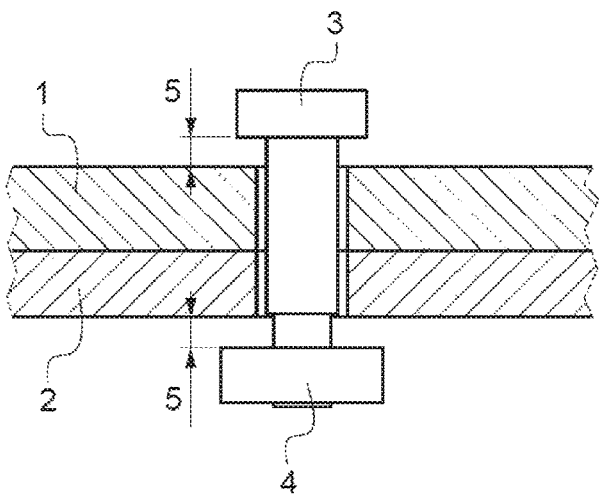
FIG. 1 is a diagrammatical representation of an example of a theoretical initial defect-free tightening configuration, being for example the origin of the curve in FIG. 2.
Figure 2:
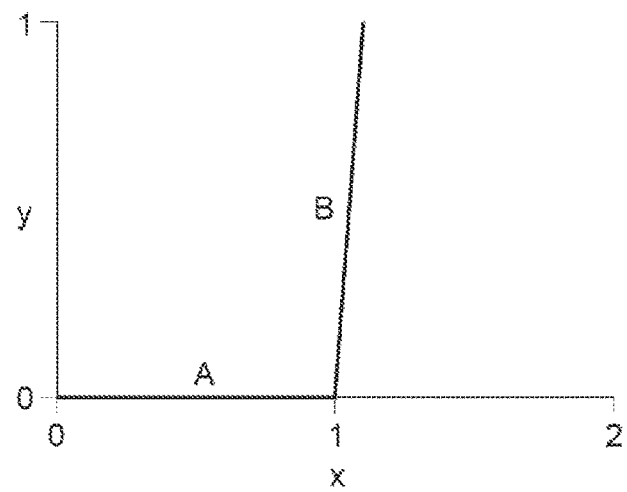
FIG. 2 is a graph showing a theoretical defect-free tightening curve, as shown in FIG. 1.

Thus, on defect-free tightening, shown for example in FIG. 1, a theoretical torque-angle curve is presented according to a graph shown in FIG. 2, on which the x-axis represents the angle and the y-axis represents the torque.

In the alignment phase A (before the screw and nut come into contact with the elements 1, 2), the angle (x) increases without the torque (y) changing (it remains substantially equal to zero). The slope of this portion A of the curve is then close to zero.

In the tightening phase B, after the initial play 5 has been eliminated, the elements 1, 2 in contact form a closed chain and, when the nut 4 continues to rotate, and therefore move along the screw 3 by means of the screw 3-nut 4 system, said elements 1, 2 are placed under increasing stress. The fastener experiences a principal state of tension, whereas the assembled elements 1, 2 are compressed. As the movement of the nut 4 along the screw 3 is directly linked to its rotation angle, a linear change in the torque as a function of the angle is observed. The slope of this straight line (portion B), that is, a first derivative of this function, depends directly on the stiffness of the components involved in the stress chain, mainly the stiffness of the fastening means (here, the screw 3-nut 4) and the tightened elements 1, 2.

Thus, in a perfect theoretical scenario, once the play 5 has been compensated, i.e., alignment has taken place, the slope equals a predetermined value (or is at least comprised within a tolerance zone relative thereto), and tightening is preferably perpetuated until the torque has reached a value (here equal to 1 for example) ensuring a certain level of tightening.

Figure 3:
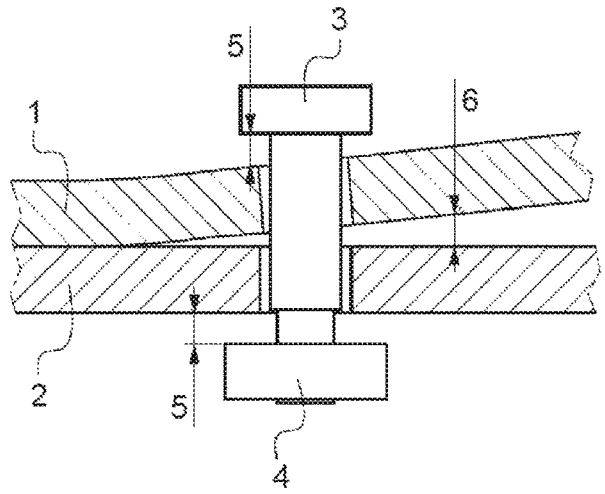
FIG. 3 is a diagrammatical representation of an example of a theoretical initial tightening configuration with a residual gap, being for example the origin of the curve in FIG. 4.

In a configuration in which the assembly has a residual gap 6, for example shown in FIG. 3, the torque (y)-angle (x) curve experiences changes in slope that represent intermediate phases, for example when a chain of surfaces in contact is established before the theoretical contact area of the elements 1, 2 to be tightened experiences the full plane-to-plane contact normally expected. There is then an intermediate phase C in which the tightening stresses firstly serve to "eliminate" residual gaps 6 and achieve plane-to-plane contact, at the fastener, before entering the tightening phase B itself. The stiffnesses (or slopes) encountered during the intermediate phase C are generally very different from the stiffness that characterizes the tightening phase B, full contact. The latter (the slope in phase B) remains very close to the slope seen in the theoretical scenario.

Thus, the method according to an embodiment of the invention exploits these slope variations or first derivative of a change of two parameters, illustrated here by the torque-angle pair.

Figure 4:
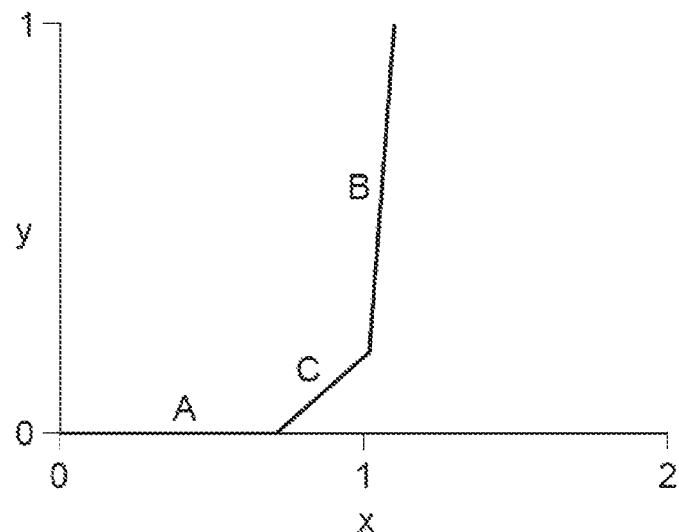
FIG. 4 is a graph showing a theoretical tightening curve with a residual gap.

FIG. 4 shows an example of a change in torque (on the y-axis) as a function of the angle (on the x-axis) if there is an intermediate phase C during which the plane-to-plane contact of the elements 1, 2 to be tightened, at the fastener, is not yet established due to the presence of the residual gap 6, reflecting the unevenness of the elements 1, 2 for example.

After an alignment phase A (similar to the defect-free theoretical scenario set out above), an intermediate phase C, i.e., a phase of compensation or even elimination of the local residual gap 6, occurs. For example, if the elements 1, 2 to be tightened are pre-positioned in a configuration in which they are not entirely parallel, and are separated by a small gap at the fastener, i.e., the residual gap 6, when a contact chain is established elsewhere, then the elements 1, 2 to be tightened are mainly subject to bending stress initially, before being compressed (actual tightening) once the local residual gap 6 has been eliminated. In the intermediate phase C, the stiffness of the elements that the fastener must overcome is much lower than the stiffness present during the tightening phase B. The slope (i.e., first derivative) of the torque-angle curve during the intermediate phase C is much shallower than the slope in the actual tightening phase B.

From a practical point of view, during the alignment phase, a tool for installing the double-access fastening means, in this case a screwdriver due to the presence of the screw 3-nut 4 system, must generally produce a low torque to overcome a number of resistive forces already present, such as those relating to the friction between the threads of the screw 3 and the nut 4. The zero angle setting of the screwdriver thus has a wide range. The analysis of the first derivative (or slope of the torque-angle curve) that characterizes the actual tightening phase B makes it possible to overcome this problem.

Thus, for the implementation of such a method, the design of an inspection system which, based on the analysis of the slopes of a curve illustrating variation dependencies between two parameters (in this case, the torque-angle curve), is capable of determining whether the conditions of validated alignment have been established, is also proposed. It is considered that, if the slope of the last part of the torque-angle curve (tightening phase B) has a value equal to a predetermined value, or within a given range on either side of the expected predetermined value, then plane-to-plane contact of the elements 1, 2 to be tightened is present at the fastener. The initial setting of the system requires an estimation of the expected value of the curve. This estimation can be carried out practically by means of theoretical calculations, but also by means of tightening in real conditions where care has been taken in advance to eliminate all significant defects. In other words, on the tightening of a fastener, collecting the torque-angle information (according to this example) makes it possible to determine whether the predetermined value of the slope (or first derivative) has been obtained at the end of tightening. The validity or invalidity information can be delivered to the user via an indicator, for example green to indicate that the alignment is valid and red to indicate invalid alignment.

Figure 5:
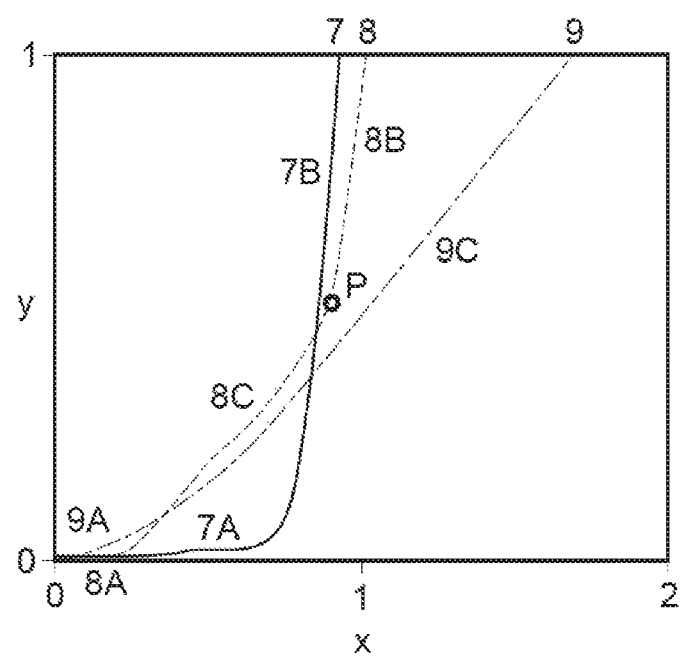
FIG. 5 is a graph showing realistic curves of a defect-free assembly (curve 7), an assembly with a defect made good at the end of tightening (curve 8) and an assembly with a defect not made good at the end of tightening (curve 9)

FIG. 5 shows three curves. A curve 7, which represents a scenario close to the defect-free theoretical scenario, has a first portion 7A showing an alignment phase, followed by a portion 7B showing a tightening phase. A curve 8 represents a scenario comprising a defect (a residual gap 6, for example) in which the defect is made good at the end of tightening. In this case, the curve 8 has a portion 8A, relatively short here, showing the alignment of the fastening means with the elements to be assembled, a portion 8C showing compensation for play or other defects, for example during which a residual gap 6 is made good, and finally a portion 8B showing actual tightening, until the installation of the fastener is complete. Finally, a curve 9 represents a scenario comprising a defect (a residual gap 6, for example) in which the defect is not made good at the end of tightening. In this case, the curve 9 has a portion 9A, relatively short here, showing the alignment of the fastener with the elements to be assembled, and a portion 9C showing compensation for play or other defects. When the installation is complete and a predetermined slope value has not yet been reached, the intermediate phase 9C is not complete.

In other words, the curves 7 and 8 have a first derivative approximately equal to the predetermined value at the end of installation of the fastener, that is, plane-to-plane contact of the elements 1, 2 to be tightened at the fastener has been achieved, and actual tightening of the elements 1, 2 has occurred.

The curve 9 does not have a sufficiently steep slope at the end of tightening, which means that the alignment conditions of the parts have not been met as expected. Collecting torque and angle information in real time can also make it possible to provide enhanced feedback to the user. For example, on the curve 8, finding a point of inflection (point P) from which the slope is established, the derivative of which corresponds to a value comprised within a tolerance zone on either side of the predetermined value, makes it possible to better characterize the value of the actual tightening that has occurred between the two tightened elements 1, 2. The lower the torque at which the point of inflection P is located, the greater the value of the actual tightening, and the closer it is to the defect-free scenario, and therefore the better the tightening.

Figure 6:
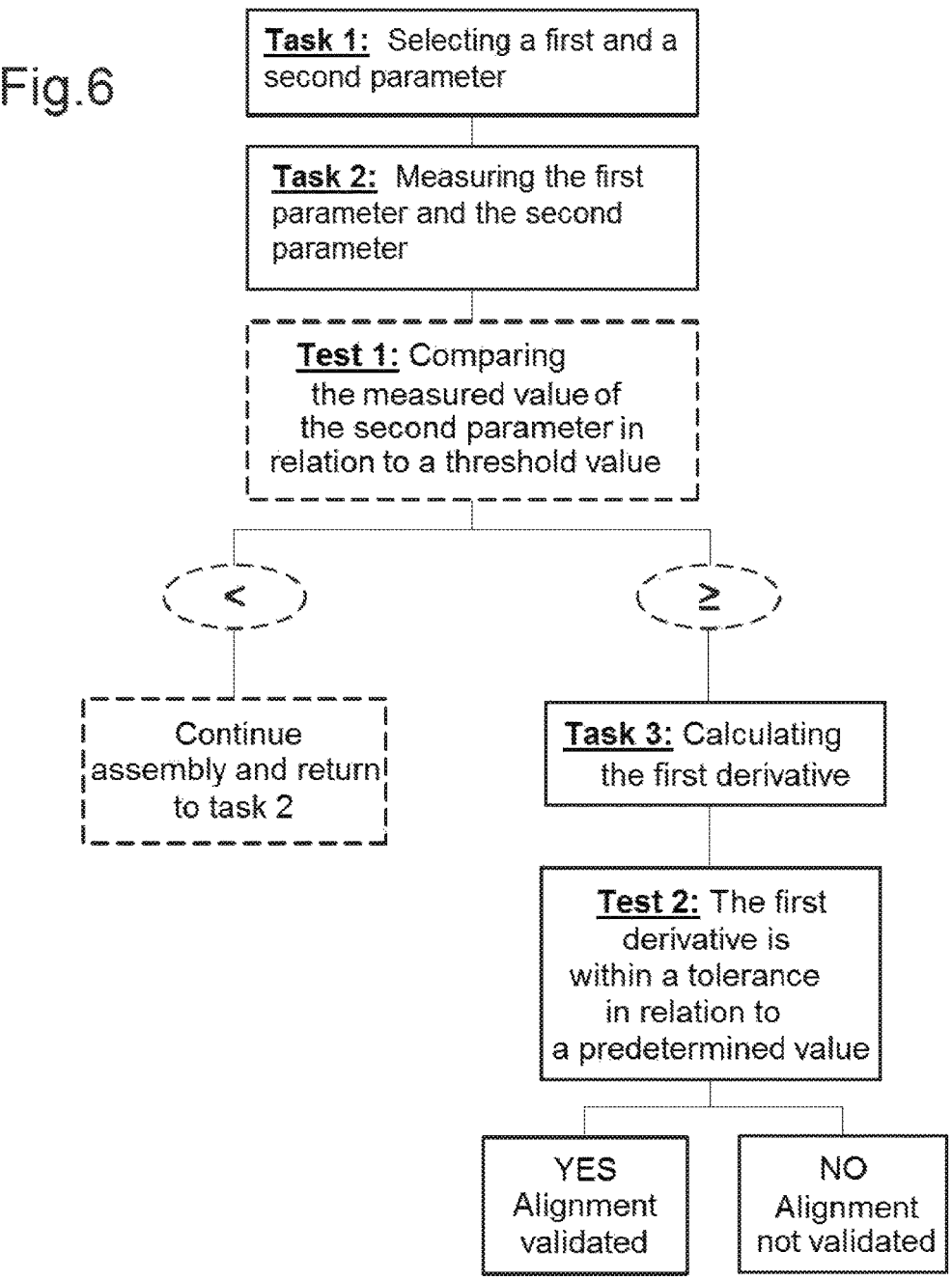
FIG. 6 is a schematic logic diagram of an embodiment of the method according to one aspect of the invention.

The logic diagram in FIG. 6 illustrates an embodiment of the method according to the invention, whatever parameters are chosen. The logic diagram thus proposes an example of task sequencing according to an embodiment of the invention and, of course, other sequences can be established.

According to the example in FIG. 6, once elements 1, 2 are put in place with a fastener, of whatever type, a first task (task 1) consists of selecting the first parameter and the second parameter, different from the first, according to the lists described above.

In a first assembly step, task 2 is performed and consists of measuring the values of the first parameter and the second parameter.

The boxes with broken outlines represent the insertion of additional tasks, consisting here of introducing a threshold value for one of the parameters, for example the second, in order to avoid calculating the first derivative or comparing it to the predetermined value throughout the entire assembly process. This makes it possible to reduce the calculation time, for example.

Thus, until one of the parameters (test 1), in this case the second, reaches the threshold, assembly must continue, for example the tightening must be increased.

In a configuration according to which a threshold value for a parameter is not taken into account, task 3 is performed directly (the boxes with broken outlines do not exist). This means that the calculation of the first derivative takes place constantly throughout assembly. A test 2 is then applied. If the calculated value of the first derivative is comprised within the tolerance zone relative to the predetermined value, the alignment is validated, but the assembly itself is not complete until one of the aforementioned parameters reaches its target value (that is, until the value of one of the parameters is comprised within a certain value range). This is the case, for example, in portions 7B or 8B of curves 7 or 8, but for a torque value of less than 1 Otherwise, if the calculated value of the first derivative is not comprised within the tolerance zone relative to the predetermined value, the assembly is still in phase A or C, and the parameters must be varied further, i.e., assembly must continue in order to align the elements.

It is also possible to slave (or control) the assembly according to one of the parameters of the pair.

Of course, the present invention is not limited to the above description, but extends to all variants within the context of the claims below.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

What is claimed is:

1. An inspection device comprising:
   a first quantitative input of a first parameter related to an assembly of a first element to a second element by a double-access fastening means, said first parameter being selected from a movement parameter of at least a first part of the double-access fastening means, an assembly force parameter, or a torque;
   a second quantitative input of a second parameter, said second parameter being selected from the movement parameter of at least the first part of the double-access fastening means, the assembly force parameter, and the torque, and the second parameter being different from the first parameter;
   a calculator which determines a value of a first derivative of a function representing a change in the second parameter relative to the first parameter;
   an analyzer which evaluates the value of the first derivative to check the alignment between the first element and the second element to be assembled; and
   wherein the analyzer detects a change in behavior of the assembly of the first element and the second element shown by slope variations in a slope of a curve of a function linking the first and second parameters, the function representing a change in the second parameter relative to the first parameter comprising an alignment phase in which the slope of the curve is then close to zero, a tightening phase, and an intermediate phase relating to the presence of a residual gap between the first element and the second element of the assembly, and
   wherein the inspection device estimates a quality of an alignment of at least a first element and a second element of an assembly by a double-access fastening means,
   wherein a basis for the quality of the alignment of the first element and the second is an elimination of the residual gap predicted by the slope of the curve.

2. The inspection device of claim 1 further comprising:
   a tool for installing the double-access fastening means for assembling the first element and the second element.

3. The inspection device of claim 2, wherein the first quantitative input is generated by one of the tool and the double-access fastening means.

4. The inspection device of claim 3 wherein the tool comprises a signal transmitter and a display to indicate a quality the alignment of the first and second elements.

5. The inspection device of claim 1 further comprising:
   a processor comprising the calculator and the analyzer.

6. The inspection device of claim 5, wherein the processor compares the first and second parameters to predetermined values, wherein detection of an incorrect alignment between the first element and the second element is related to a difference between the value of the first derivative, resulting from the measured values, and a predetermined, pre-recorded value, representative of an aligned assembly.

7. The inspection device of claim 6, wherein the processor runs a computer software.

* * * * *